United States Patent
Tojima et al.

(10) Patent No.: US 10,511,199 B2
(45) Date of Patent: Dec. 17, 2019

(54) ROTARY MACHINE AND METHOD FOR MANUFACTURING ROTARY MACHINE

(71) Applicant: IHI Corporation, Tokyo (JP)

(72) Inventors: Narifumi Tojima, Tokyo (JP); Takehiro Jikumaru, Tokyo (JP)

(73) Assignee: IHI CORPORATION, Tokyo (JP)

( * ) Notice: Subject to any disclaimer, the term of this patent is extended or adjusted under 35 U.S.C. 154(b) by 242 days.

(21) Appl. No.: 15/491,761

(22) Filed: Apr. 19, 2017

(65) Prior Publication Data

US 2017/0222507 A1 Aug. 3, 2017

Related U.S. Application Data

(63) Continuation of application No. PCT/JP2015/079976, filed on Oct. 23, 2015.

(30) Foreign Application Priority Data

Oct. 24, 2014 (JP) ................. 2014-217020

(51) Int. Cl.
| | |
|---|---|
| *H02K 3/18* | (2006.01) |
| *H02K 1/14* | (2006.01) |
| *H02K 15/04* | (2006.01) |
| *H02K 15/06* | (2006.01) |
| *H02K 19/10* | (2006.01) |
| *H02K 29/03* | (2006.01) |

(52) U.S. Cl.
CPC ............. *H02K 3/18* (2013.01); *H02K 1/146* (2013.01); *H02K 15/0435* (2013.01); *H02K 15/066* (2013.01); *H02K 19/103* (2013.01); *H02K 29/03* (2013.01)

(58) Field of Classification Search
CPC .......... H02K 1/14; H02K 15/04; H02K 15/06; H02K 3/18; H02K 1/146; H02K 19/103; H02K 15/066; H02K 15/0435; H02K 29/03
USPC .................................................. 310/179–210
See application file for complete search history.

(56) References Cited

U.S. PATENT DOCUMENTS

| | | | |
|---|---|---|---|
| 6,218,758 B1 * | 4/2001 | Miura | ...................... H02K 3/18 310/208 |
| 6,876,106 B2 | 4/2005 | Miyashita et al. | |
| 7,042,119 B2 | 5/2006 | Miyashita et al. | |
| 2003/0230940 A1 | 12/2003 | Miyashita et al. | |
| 2005/0151428 A1 | 7/2005 | Miyashita et al. | |
| 2009/0085422 A1 | 4/2009 | Kusawake et al. | |

(Continued)

FOREIGN PATENT DOCUMENTS

| | | |
|---|---|---|
| CN | 102306961 A | 1/2012 |
| EP | 0 613 234 A1 | 8/1994 |
| EP | 1 035 630 A2 | 9/2000 |

(Continued)

*Primary Examiner* — Naishadh N Desai
(74) *Attorney, Agent, or Firm* — Rothwell, Figg, Ernst & Manbeck, P.C.

(57) ABSTRACT

The rotary machine of the present disclosure is provided with an annular stator that has: an annular yoke section; multiple salient poles that protrude radially inward and are arranged circumferentially; and coils disposed on the salient poles. Circumferential surfaces of the salient poles are formed into tapered surfaces that taper toward the tip of the salient poles, and the coils include a first coil and a second coil.

11 Claims, 4 Drawing Sheets

(56) References Cited

U.S. PATENT DOCUMENTS

2010/0066198 A1* 3/2010 Fubuki ................. H02K 15/066
310/208
2014/0015368 A1 1/2014 Okumura et al.

FOREIGN PATENT DOCUMENTS

| | | |
|---|---|---|
| EP | 2 026 447 A1 | 2/2009 |
| EP | 2 688 183 A2 | 1/2014 |
| JP | 9-308142 A | 11/1997 |
| JP | 11-32457 A | 2/1999 |
| JP | 2000-41365 A | 2/2000 |
| JP | 2000-324739 A | 11/2000 |
| JP | 2004-7884 A | 1/2004 |
| JP | 2008-167593 A | 7/2008 |
| JP | 2008-220093 A | 9/2008 |
| JP | 2014-82838 A | 5/2014 |
| WO | 2007/055210 A1 | 5/2007 |
| WO | 2007/141830 A1 | 12/2007 |
| WO | 2012/137302 A1 | 10/2012 |
| WO | 2014/002545 A1 | 1/2014 |

* cited by examiner

ROTARY MACHINE AND METHOD FOR MANUFACTURING ROTARY MACHINE

CROSS-REFERENCE TO RELATED APPLICATIONS

The present application is a continuation application of International Application No. PCT/JP2015/079976, filed Oct. 23, 2015, which claims priority to Japanese Patent Application No. 2014-217020, filed Oct. 24, 2014. The contents of these applications are incorporated herein by reference in their entirety.

TECHNICAL FIELD

The present disclosure relates to a rotary machine and a method for manufacturing a rotary machine.

BACKGROUND

As shown in Patent Document 1, for example, in a rotary machine such as a motor, there is a case in which a salient pole whose circumferential surface is a tapered surface that is tapered toward a tip is employed. By using such a shape of the salient pole, magnetic saturation can be suppressed and degradation of motor efficiency can be suppressed even at the time of high power output. Also, Patent Document 2 discloses that, in a stator of a motor, a coil is formed by edgewise bending and spirally winding of a flat type conductor having a rectangular cross section molded from an element wire, and the flat type conductor is molded into a stepped shape in advance so that lengths of a long side and a short side of the rectangular cross section are different for each turn when it is wound. By having such a shape, the coil space factor of a first coil and a second coil with respect to a slot can be increased. In addition, background art is disclosed also in Patent Documents 3 to 4.

DOCUMENTS OF THE RELATED ART

Patent Document

[Patent Document 1]
PCT International Publication No. WO 2012/137302
[Patent Document 2]
Japanese Unexamined Patent Application, First Publication No. 2008-167593
[Patent Document 3]
Japanese Unexamined Patent Application, First Publication No. H11-032457
[Patent Document 4]
Japanese Unexamined Patent Application, First Publication No. 2000-041365
[Patent Document 5]
Japanese Unexamined Patent Application, First Publication No. H09-308142

SUMMARY

Coils can be provided in a single stator. Normally, these coils have the same shape. When the coils are used to maximize the space factor, generally, such a same shaped coil can be provided to be in contact with an adjacent coil. However, when coils of the same shape are provided on salient poles which protrude toward a radial inner side of the stator, whose circumferential surface is a tapered surface, a dead space in which there is no winding between the salient poles is generated. More specifically, in assembling the stator, when the coils that have been molded are sequentially mounted on the salient poles provided in a circumferential direction, a coil is mounted on each of the salient poles along each central axis of the salient poles facing a radial direction of the stator. At this time, to prevent an end portion of an outer circumferential surface of a previously mounted coil close to an inner side of the stator from interfering with an end portion of an outer circumferential surface of a subsequently mounted coil close to an outer side of the stator, it is necessary to reduce a diameter of the end portion of the coil close to the outer side of the stator. As a result, a dead space is generated between adjacent coils.

The present disclosure is made in consideration of the above-described problems and directed to improve the performance of a rotary machine in which a stator having salient poles protruding toward the radial inner side is provided by improving the coil space factor.

To achieve the above-described objects, a first aspect of the present disclosure is a rotary machine including an annular stator having an annular yoke portion, salient poles protruding toward a radial inner side and arranged in a circumferential direction, and a coil provided on the salient poles, wherein a circumferential surface of each of the salient poles is a tapered surface tapered toward a tip of the salient pole. The coil includes a first coil having an inner circumferential surface inclined along the tapered surface of the salient pole and an outer circumferential surface inclined toward the radial inner side of the stator and a second coil provided on the salient pole adjacent to the salient pole on which the first coil is provided and having an inner circumferential surface inclined along the tapered surface of the salient pole and an outer circumferential surface inclined toward a radial outer side of the stator.

A second aspect of the present disclosure is a method of manufacturing a rotary machine including an annular stator having an annular yoke portion, salient poles protruding toward a radial inner side and arranged in a circumferential direction, and a coil provided on the salient poles, wherein a circumferential surface of each of the salient poles is a tapered surface tapered toward a tip of the salient pole, and wherein the coil includes a first coil having an inner circumferential surface inclined along the tapered surface of the salient pole and an outer circumferential surface inclined toward the radial inner side of the stator and a second coil provided on the salient pole adjacent to the salient pole on which the first coil is provided and having an inner circumferential surface inclined along the tapered surface of the salient pole and an outer circumferential surface inclined toward a radial outer side of the stator. This method of manufacturing the rotary machine includes a winding process in which the first coil and the second coil are molded by winding the windings multiple times, a press process in which the coils molded in the winding process are compression-molded, and an assembly process in which the coils compression-molded in the press process are mounted on the salient poles.

According to a rotary machine of the present disclosure, a coil includes a first coil having an inner circumferential surface inclined along a tapered surface of each salient pole and an outer circumferential surface inclined toward a radial inner side of a stator and a second coil having an inner circumferential surface inclined along the tapered surface of the salient pole and an outer circumferential surface inclined toward a radial outer side of the stator. Also, the first coil and the second coil are alternately provided on the salient poles in a circumferential direction of the stator. According to the rotary machine described above, when the first coil is mounted on each of the salient poles in advance, since an outer circumferential surface of the first coil is inclined toward the radial outer side of the stator, an end portion of the outer circumferential surface of the first coil close to the inner side of the stator is disposed close to the salient pole. Thus, it is possible to prevent the end portion of the outer circumferential surface of the first coil close to the inner side of the stator from disturbing the mounting of the second coil. In addition, since the second coil has an outer circumferential surface which is inclined so as to face the radial outer side of the stator, an end portion of the outer circumferential surface close to the inner side of the stator becomes more distant from the salient pole. Thus, since the outer circumferential surface of the second coil can be come close to or brought into contact with the outer circumferential surface of the first coil, the coil space factor can be improved. According to the present disclosure described above, by alternately providing two coils with different shapes on the salient poles, all the coils can be mounted on the salient poles and improvement in the coil space factor is realized. According to the present disclosure described above, it is possible to increase the performance of a rotary machine in which a stator having salient poles protruding toward a radial inner side is provided by improving the coil space factor.

DETAILED DESCRIPTION

Hereinafter, one embodiment of a rotary machine according to the present disclosure will be described with reference to the drawings. Also, in the following embodiments, an example in which the rotary machine of the present disclosure is applied to a switched reluctance motor will be described.

Figure 1:
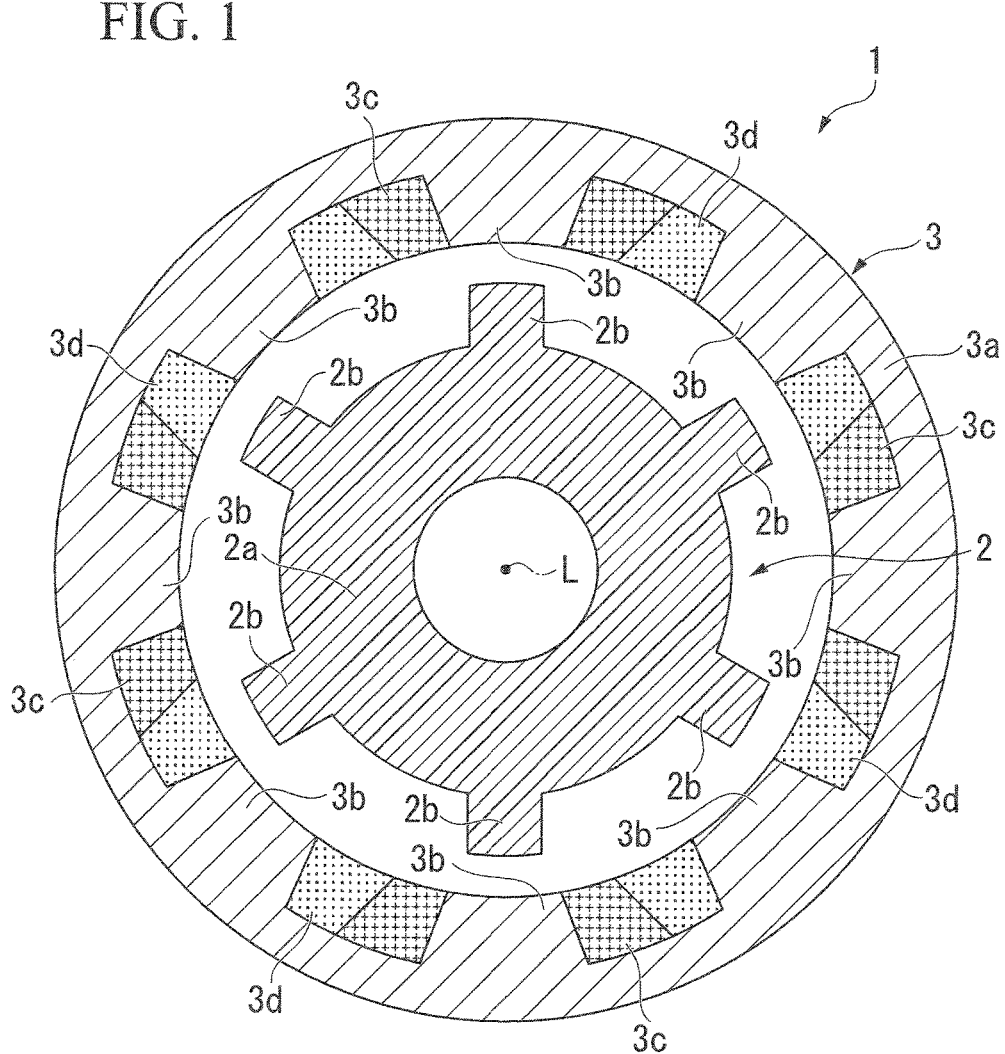
FIG. 1 is a cross-sectional view of a switched reluctance motor according to one embodiment of the present disclosure.

FIG. 1 is a cross-sectional view of a switched reluctance motor 1 of the present embodiment. As shown in FIG. 1, the switched reluctance motor 1 of the present embodiment includes a rotor 2 and a stator 3. Although not shown in FIG. 1, the switched reluctance motor 1 of the present embodiment includes necessary components such as a casing, a shaft, a control circuit, and the like.

The rotor 2 has an annular shape centered on a rotor shaft L and is rotatably supported about the rotor shaft L by bearings or the like that are not shown. The rotor 2 includes an annular yoke portion 2a and salient poles 2b which protrude from the yoke portion 2a toward an outer side of the rotor 2. The yoke portion 2a and salient poles 2b are formed by fastening electromagnetic steel sheets stacked in a direction along the rotor shaft L using any one method of press-fitting, shrinkage-fitting, or bolting (not shown). The salient poles 2b protrude from an outer circumferential surface of the yoke portion 2a toward the stator 3 and the salient poles 2b are provided at regular intervals in a circumferential direction of the rotor 2. In addition, in the present embodiment, six salient poles 2b are provided at intervals of 60° as shown in FIG. 1.

The stator 3 is disposed on the outside of the rotor 2 and has an annular shape centered on the rotor shaft L to surround the rotor 2 from a radial outer side. Such a stator 3 includes an annular yoke portion 3a and salient poles 3b which protrude from the yoke portion 3a toward an inner side of the stator 3. The yoke portion 3a and salient poles 3b are integrally formed of a magnetic material. In addition, the stator 3 includes a first coil 3c and a second coil 3d wound around the salient poles 3b.

Each of the salient poles 3b protrudes from an inner circumferential surface of the yoke portion 3a toward the rotor 2 and includes a circumferential surface tapered toward a tip. That is, the salient pole 3b has a tapered surface 3b1 tapered toward the tip. Also, the salient poles 3b are provided at regular intervals in a circumferential direction of the stator 3. In the present embodiment, eight salient poles 3b are provided at intervals of 45° as shown in FIG. 1.

Figure 2:
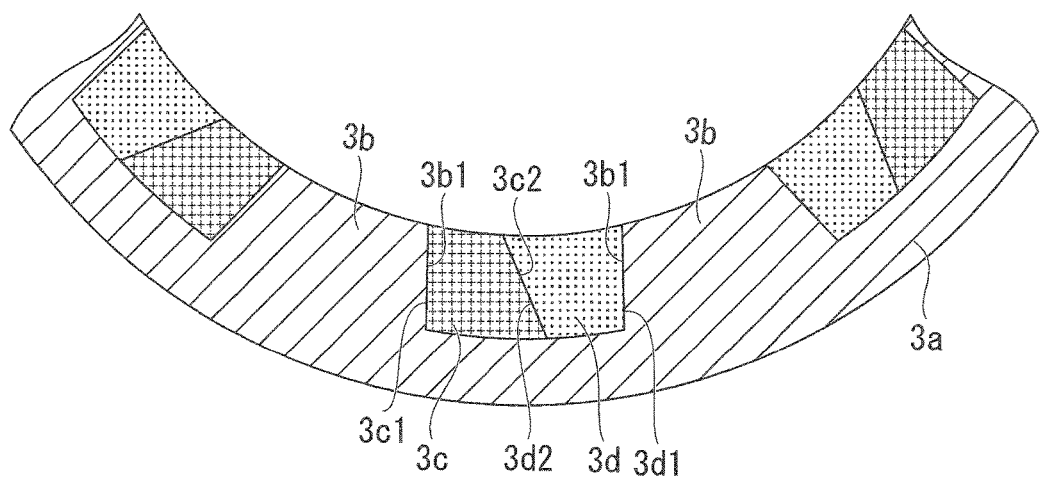
FIG. 2 is a partially enlarged cross-sectional view of a switched reluctance motor according to one embodiment of the present disclosure.

FIG. 2 is an enlarged view of the stator 3. As shown in FIG. 2, the first coil 3c includes an inner circumferential surface 3c1 inclined along the tapered surface 3b1 of each of the salient poles 3b and an outer circumferential surface 3c2 inclined toward a radial outer side of the stator 3. Also, the first coil 3c is constituted by a winding (element wire) that is densely wound multiple times. The winding which constitutes this first coil 3c is regularly wound so that each turn of the winding along the tapered surface 3b1 of the salient pole 3b is in close contact with each other and each turn of the winding along the inner circumferential surface of the yoke portion 3a in which the salient pole 3b is not formed is in close contact with each other. However, since the first coil 3c is molded by further compressing the winding that has been wound and molded into a shape close to the first coil 3c, the "each turn of the winding along the tapered surface 3b1 of the salient pole 3b is in close contact with each other" also includes each turn of the winding being in close contact with each other with a slight deviation from the direction along the tapered surface 3b1 and the "each turn of the winding along the inner circumferential surface of the yoke portion 3a in which the salient pole 3b is not formed is in close contact with each other" also includes each turn of the winding being in close contact with each other with a slight deviation from a direction along the inner circumferential surface of the yoke portion 3a in which the salient pole 3b is not formed. Here, the inner circumferential surface 3c1 and the outer circumferential surface 3c2 refer to an inner circumferential surface and an outer circumferential surface of the molded body obtained by finally molding the winding into the shape of the first coil 3c. The inner circumferential surface 3c1 and the outer circumferential surface 3c2 described as above are determined in advance at a design stage and are formed according to the design.

Such a first coil 3c has an inner diameter in which the inner circumferential surface 3c1 is in contact with the tapered surface 3b1 of the salient pole 3b. Here, the inner circumferential surface 3c1 is inclined along the tapered surface 3b1 of the salient pole 3b. Thus, as shown in FIG. 2, the inner circumferential surface 3c1 of the first coil 3c is in surface contact with the tapered surface 3b1 of the salient pole 3b.

Also, the first coil 3c is inclined such that the outer circumferential surface 3c2 faces the radial outer side of the stator 3 when a radial direction of the stator 3 passing through the outer circumferential surface 3c2 is taken as a reference. Therefore, an end portion of the outer circumferential surface 3c2 close to the inner side of the stator 3 (an end portion of an upper side of the first coil 3c in FIG. 2) is disposed close to the salient pole 3b on which the first coil 3c is provided when compared to a case in which the outer circumferential surface is formed along the radial direction of the stator 3 or in parallel with a central axis of the salient pole 3b.

The second coil 3d is provided on a salient pole 3b adjacent to the salient pole 3b on which the first coil 3c is provided, and includes an inner circumferential surface 3d1 inclined along a tapered surface 3b1 of the salient pole 3b and an outer circumferential surface 3d2 inclined toward a radial inner side of the stator 3. In addition, as in the first coil 3c, the second coil 3d also is constituted by a winding (element wire) that is densely wound multiple times. The winding constituting this second coil 3d is regularly wound so that each turn of the winding along the tapered surface 3b1 of the salient pole 3b is in close contact with each other and each turn of the winding along the inner circumferential surface of the yoke portion 3a in which the salient pole 3b is not formed is in close contact with each other. However, since the second coil 3d is molded by further compressing the winding that has been wound and molded into a shape close to the second coil 3d, the "each turn of the winding along the tapered surface 3b1 of the salient pole 3b is in close contact with each other" also includes each turn of the winding being in close contact with each other with a slight deviation from the direction along the tapered surface 3b1 and the "each turn of the winding along the inner circumferential surface of the yoke portion 3a in which the salient pole 3b is not foil led is in close contact with each other" also includes each turn of the windings being in close contact with each other with a slight deviation from a direction along the inner circumferential surface of the yoke portion 3a in which the salient pole 3b is not formed. Here, the inner circumferential surface 3d1 and the outer circumferential surface 3d2 refer to an inner circumferential surface and an outer circumferential surface of the molded body obtained by finally molding the winding into the shape of the second coil 3d. The inner circumferential surface 3d1 and the outer circumferential surface 3d2 described as above are determined in advance at a design stage and are formed according to the design.

Such a second coil 3d has an inner diameter in which the inner circumferential surface 3d1 is in contact with the tapered surface 3b1 of the salient pole 3b. Here, the inner circumferential surface 3c1 is inclined along the tapered surface 3b1 of the salient pole 3b. Thus, as shown in FIG. 2, the inner circumferential surface 3d1 of the second coil 3d is in surface contact with the tapered surface 3b1 of the salient pole 3b.

Also, the second coil 3d is inclined such that the outer circumferential surface 3d2 faces the radial inner side of the stator 3 when the radial direction of the stator 3 passing through the outer circumferential surface 3d2 is taken as a reference. Therefore, an end portion of the outer circumferential surface 3d2 close to the inner side of the stator 3 (an end portion of the upper side of the second coil 3d in FIG. 2) is disposed to become more distant from the salient pole 3b on which the second coil 3d is provided when compared to a case in which the outer circumferential surface is formed along the radial direction of the stator 3 or in parallel with the central axis of the salient pole 3b.

Also, in the present embodiment, an inclination angle formed by a reference line along the radial direction of the stator 3 and the outer circumferential surface 3c2 of the first coil 3c inclined so as to face the inner side of the stator 3 and an inclination angle formed by the radial direction of the stator 3 (the reference line) and the outer circumferential surface 3d2 of the second coil 3d inclined so as to face the outer side of the stator 3 are set to be the same. In addition, an outer diameter of the first coil 3c and an outer diameter of the second coil 3d are set so that the outer circumferential surface 3c2 and the outer circumferential surface 3d2 are in surface contact with each other. Thus, the outer circumferential surface 3c2 of the first coil 3c is in surface contact with the outer circumferential surface 3d2 of the second coil 3d in the entire region in the radial direction of the stator 3 at a position in which they are in contact with each other.

Also, a diameter of the first coil 3c and a diameter of the second coil 3d are set so that a cross-sectional area of a cross section perpendicular to the winding direction of the winding of the first coil 3c (a cross section shown in FIG. 2) and a cross-sectional area of a cross section perpendicular to the winding direction of the winding of the second coil 3d (a cross section shown in FIG. 2) are the same. When it is assumed that the inner and outer side surfaces of the stator 3 at the first coil 3c and the second coil 3d are planar, a shape of the above-described cross sections of the first coil 3c and the second coil 3d is trapezoidal as shown in FIG. 2.

Figure 3:
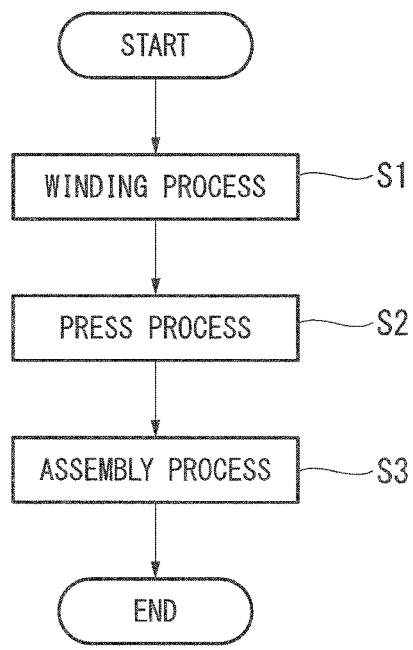
FIG. 3 is a flowchart showing a method of manufacturing a switched reluctance motor according to one embodiment of the present disclosure.
Figure 4:
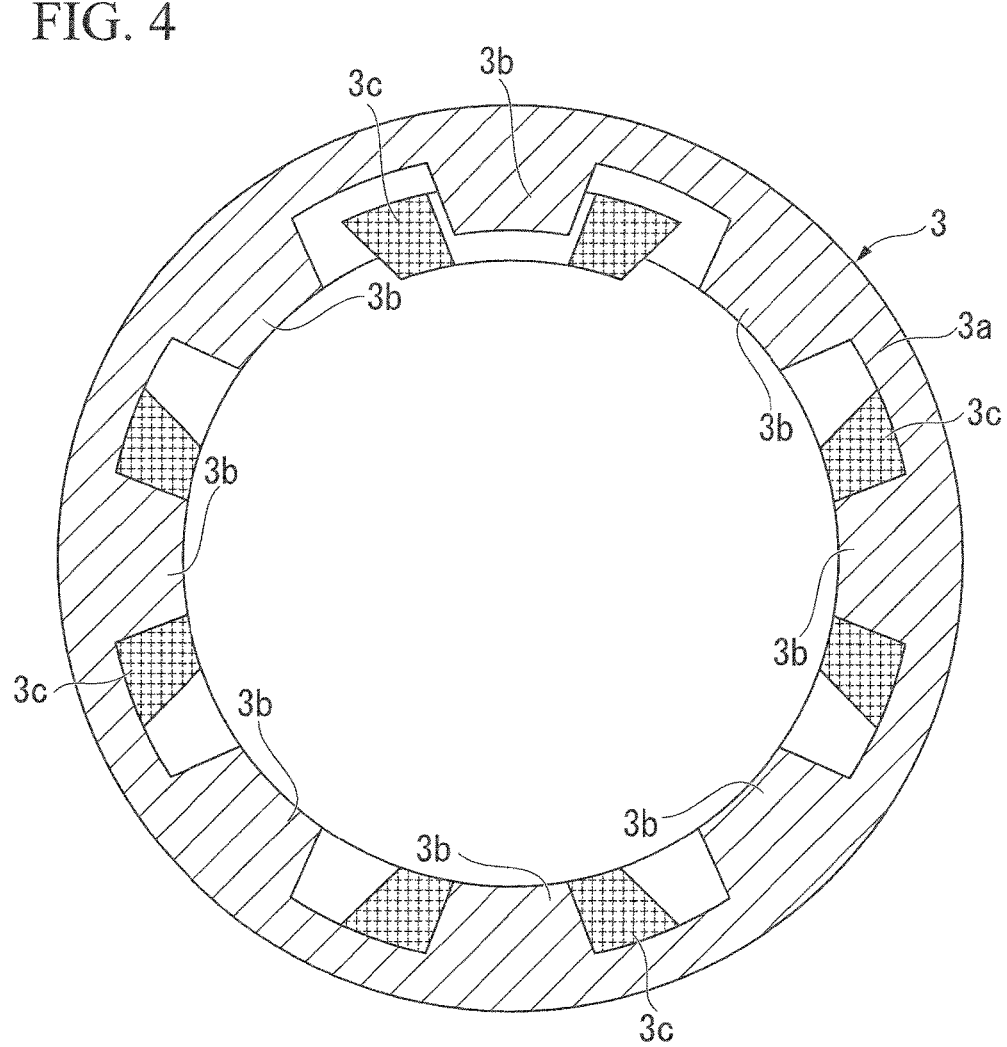
FIG. 4 is a cross-sectional view showing a process of manufacturing a switched reluctance motor according to one embodiment of the present disclosure.
Figure 5:
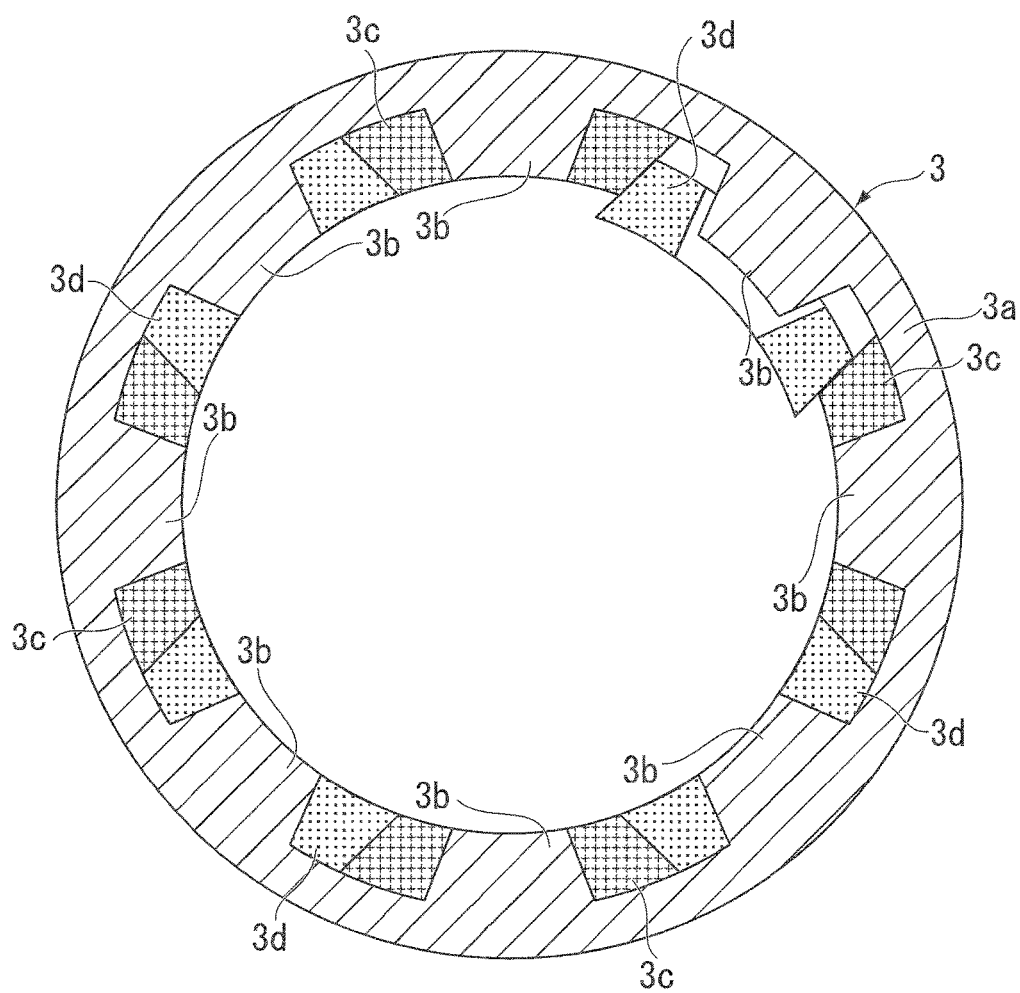
FIG. 5 is a cross-sectional view showing a process of manufacturing a switched reluctance motor according to one embodiment of the present disclosure.

Next, a method of manufacturing such a switched reluctance motor 1 of the present embodiment will be described with reference to FIGS. 3 to 5. FIG. 3 is a flowchart schematically showing a process of manufacturing the switched reluctance motor 1 of the present embodiment. In addition, in the following description, it is assumed that the rotor 2 and an integrally molded body of the yoke portion 3a and the salient pole 3b of the stator 3 have already been formed.

First, as shown in FIG. 3, a winding process (Step S1) is performed. In this step, the first coil 3c and the second coil 3d are molded by winding the winding multiple times. Specifically, the first coil 3c and the second coil 3d are molded by regularly winding the winding so that, assuming the tapered surface 3b1 of the salient pole 3b, each turn of the winding along the tapered surface is in close contact with each other and, assuming the inner circumferential surface of the yoke portion 3a in which the salient pole 3b is not formed, each turn of the winding along the inner circumferential surface is in close contact with each other. Here, the first coil 3c and the second coil 3d are molded such that sizes thereof are larger than the final sizes. In addition, when a large current is used in the switched reluctance motor 1, it is suitable to reduce copper loss by increasing a cross-sectional area of a body portion of the winding to reduce a resistance value of the switched reluctance motor 1. Thus, in the winding process S1, the winding may not be wound by a single wire, but may be wound by a state in which two or more wires are bundled (in parallel). Next, a press process (Step S2) is performed as shown in FIG. 3. In this step, the first coil 3c and the second coil 3d which have been molded in the winding process S1 are compression-molded by press processing using a die. Thereby, winding densities of the first coil 3c and the second coil 3d are increased and the first coil 3c and the second coil 3d are molded into the final shapes and sizes.

Next, an assembly process (Step S3) is performed as shown in FIG. 3. In this step, the first coil 3c and the second coil 3d compression-molded by the press process S2 are mounted on the salient poles 3b of the stator 3. First, the first coil 3c is mounted on every other one of the salient poles 3b disposed in a circumferential direction of the stator 3 as shown in FIG. 4, and then, the second coil 3d is mounted on salient poles 3b on which the first coil 3c has not been mounted as shown in FIG. 5. After this, the rotor 2 and the like can be assembled.

According to the present embodiment described above, the switched reluctance motor 1 includes the first coil 3c having the inner circumferential surface 3c1 inclined along the tapered surface 3b1 of the salient poles 3b and the outer circumferential surface 3c2 inclined toward the radial outer side of the stator 3, and the second coil 3d having the inner circumferential surface 3d1 inclined along the tapered surface 3b1 of the salient poles 3b and the outer circumferential surface 3d2 inclined toward the radial inner side of the stator 3. Also, the first coil 3c and the second coil 3d are alternately provided at the salient poles 3b disposed in the circumferential direction of the stator 3.

According to the switched reluctance motor 1 of the present embodiment described above, as shown in FIG. 4, when the first coil 3c is mounted on each of the salient poles 3b first, since the outer circumferential surface 3c2 of the first coil 3c is inclined toward the radial outer side of the stator 3, the end portion of the outer circumferential surface 3c2 of the first coil 3c close to the inner side of the stator 3 is disposed close to the salient pole 3b. Thus, as shown in FIG. 5, it is possible to prevent the end portion of the outer circumferential surface 3c2 of the first coil 3c close to the inner side of the stator 3 from disturbing the mounting of the second coil 3d.

In addition, since the second coil 3d has the outer circumferential surface 3d2 which is inclined so as to face the radial outer side of the stator 3, the end portion of the outer circumferential surface 3d2 close to the inner side of the stator 3 becomes more distant from the salient pole 3b. Thus, the outer circumferential surface 3d2 of the second coil 3d can be brought into contact with the outer circumferential surface 3c2 of the first coil 3c, and thereby the coil space factor can be improved.

According to the switched reluctance motor 1 of the present embodiment described above, by alternately providing two coils with different shapes on the salient poles, all the coils can be mounted on the salient poles 2b and improvement in the coil space factor is realized. According to the switched reluctance motor 1 of the present embodiment described above, it is possible to improve the performance by improving the coil space factor.

Also, in the switched reluctance motor 1 of the present embodiment, the outer circumferential surface 3c2 of the first coil 3c is in contact with the outer circumferential surface 3d2 of the second coil 3d in the entire region in the radial direction of the stator 3 at a position in which they are in contact with each other. Therefore, it is possible to maximize the coil space factor.

Also, in the switched reluctance motor 1 of the present embodiment, the cross-sectional area of the cross section perpendicular to the winding direction of the winding of the first coil 3c (a cross section shown in FIG. 2) and the cross-sectional area of the cross section perpendicular to the winding direction of the winding of the second coil 3d (a cross section shown in FIG. 2) are set to be the same. Therefore, since magnetic flux density formed by the first coil 3c and magnetic flux density formed by the second coil 3d can be the same, it is possible to effectively reduce torque ripple or the like.

Also, in the switched reluctance motor 1 of the present embodiment, the above-described cross sections of the first coil 3c and a second coil 3d have a trapezoidal shape as shown in FIG. 2. For example, it may be possible for the above-described cross sections of the first coil 3c and the second coil 3d to have a triangular shape, but in such a case, the top portion of the triangle is pointed at an acute angle. Thus, there is a possibility that the first coil 3c and a second coil 3d are likely to structurally collapse. On the other hand, when the cross section of the first coil 3c and the second coil 3d has a trapezoidal shape as described above, the first coil 3c and the second coil 3d have high strength and cannot easily collapse.

Also, the present disclosure is not limited to the above-described embodiment, and for example, the following modified examples can be considered. In the above-described embodiment, an example in which the present disclosure is applied to the switched reluctance motor 1 has been described, but the present disclosure is not limited thereto. For example, it is possible to apply the present disclosure to permanent magnet (PM) motors. Also, it is also possible to apply this disclosure to other rotary machines such as an electric generator.

INDUSTRIAL APPLICABILITY

According to the present disclosure, it is possible to improve the performance of a rotary machine in which a stator having salient poles protruding toward an inner side is provided by improving the coil space factor.

What is claimed is:

1. A rotary machine comprising:
an annular stator including:
an annular yoke portion;
salient poles protruding toward a radial inner side and arranged in a circumferential direction; and
a coil provided on the salient poles,
wherein a circumferential surface of each of the salient poles is a tapered surface tapered toward a tip of the salient pole, and
wherein the coil includes:
a first coil having an inner circumferential surface inclined along the tapered surface of the salient pole and an outer circumferential surface inclined toward the radial inner side of the stator; and
a second coil provided on the salient pole adjacent to the salient pole on which the first coil is provided and having an inner circumferential surface inclined along the tapered surface of the salient pole and an outer circumferential surface inclined toward a radial outer side of the stator,
the outer circumferential surface of the first coil is inclined as it approaches the salient pole on which the first coil is provided from a first end portion toward a second end portion of the first coil, wherein the first end portion is on the radial outer side of the stator, and the second end portion is on the radial inner side of the stator, and
the outer circumferential surface of the second coil is inclined as it departs from the salient pole on which the second coil is provided from a third end portion toward a fourth end portion of the second coil, wherein the third end portion is on the radial outer side of the stator, and the fourth end portion is on the radial inner side of the stator.

2. The rotary machine according to claim 1, wherein the outer circumferential surface of the first coil and the outer circumferential surface of the second coil which are adjacent to each other are in contact with each other in an entire region in a radial direction of the stator.

3. The rotary machine according to claim 1, wherein each shape of a cross section perpendicular to a winding direction of a winding of the first coil and a cross section perpendicular to a winding direction of a winding of the second coil is trapezoidal.

4. The rotary machine according to claim 1, wherein, a cross-sectional area of the cross section perpendicular to the winding direction of the winding of the first coil and a cross-sectional area of the cross section perpendicular to the winding direction of the winding of the second coil are the same.

5. The rotary machine according to claim 2, wherein, a cross-sectional area of the cross section perpendicular to the winding direction of the winding of the first coil and a cross-sectional area of the cross section perpendicular to the winding direction of the winding of the second coil are the same.

6. The rotary machine according to claim 3, wherein, a cross-sectional area of the cross section perpendicular to the winding direction of the winding of the first coil and a cross-sectional area of the cross section perpendicular to the winding direction of the winding of the second coil are the same.

7. The rotary machine according to claim 1, wherein the winding is regularly wound so that each turn of the winding along the tapered surface of the salient pole is in close contact with each other and each turn of the winding along an inner circumferential surface of the yoke portion in which the salient pole is not formed is in close contact with each other.

8. A method of manufacturing a rotary machine including:
an annular stator having:
an annular yoke portion;
salient poles protruding toward a radial inner side and arranged in a circumferential direction; and
a coil provided on the salient poles,
wherein a circumferential surface of each of the salient poles is a tapered surface tapered toward a tip of the salient pole,
wherein the coil includes:
a first coil having an inner circumferential surface inclined along the tapered surface of the salient pole and an outer circumferential surface inclined toward the radial inner side of the stator; and
a second coil provided on the salient pole adjacent to the salient pole on which the first coil is provided and having an inner circumferential surface inclined along the tapered surface of the salient pole and an outer circumferential surface inclined toward a radial outer side of the stator,
the outer circumferential surface of the first coil is inclined as it approaches the salient pole on which the first coil is provided from a first end portion toward the second end portion of the first coil, wherein the first end portion is on the radial outer side of the stator, and the second end portion is on the radial inner side of the stator, and
the outer circumferential surface of the second coil is inclined as it departs from the salient pole on which the second coil is provided from a third end portion toward the fourth end portion of the second coil, wherein the third end portion is on the radial outer side of the stator, and the fourth end portion is on the radial inner side of the stator, the method comprising:

a winding process in which the first coil and the second coil are molded by winding a winding multiple times as the outer circumferential surfaces of the first and second coils are formed, the outer circumferential surface of the first coil is inclined as it approaches a center axis of the first coil from the first end portion toward the second end portion of the first coil, wherein the first end portion is on one end side in a direction of the center axis the first coil, and the second end portion is on the other end side in the direction of the center axis of the first coil, the outer circumferential surface of the second coil is inclined as it departs from a center axis of the second coil from the third end portion toward the fourth end portion of the second coil, wherein the third end portion is on one end side in a direction of the center axis of the second coil, and the fourth end portion is on the other end side in the direction of the center axis of the second coil;

a press process in which the first coil and the second coil molded in the winding process are compression-molded;

a first assembly process in which the first coil compression-molded in the press process is mounted on every other one of the salient poles as the first end portion is disposed on the radial outer side of the stator; and a second assembly process in which the second coil compression-molded in the press process is mounted on others of the salient poles on which the first coil is not mounted as the third end portion is disposed on the radial outer side of the stator.

9. The method of manufacturing the rotary machine according to claim 8, wherein, in the winding process, the winding is regularly wound so that, assuming the tapered surface of the salient pole, each turn of the winding along the tapered surface is in close contact with each other and, assuming an inner circumferential surface of the yoke portion in which the salient pole is not formed, each turn of the winding along the inner circumferential surface is in close contact with each other.

10. The rotary machine according to claim 2, wherein each shape of a cross section perpendicular to a winding direction of a winding of the first coil and a cross section perpendicular to a winding direction of a winding of the second coil is trapezoidal.

11. The rotary machine according to claim 10, wherein, a cross-sectional area of the cross section perpendicular to the winding direction of the winding of the first coil and a cross-sectional area of the cross section perpendicular to the winding direction of the winding of the second coil are the same.

* * * * *